(12) United States Patent
Suda et al.

(10) Patent No.: US 7,406,890 B2
(45) Date of Patent: Aug. 5, 2008

(54) STEERING CONTROLLER OF VEHICLE

(75) Inventors: Katsuhiro Suda, Yokohama (JP); Takao Nojiri, Yokohama (JP); Naoki Hikosaka, Kosai (JP); Hidekazu Michioka, Tokyo (JP); Masashi Konomoto, Tokyo (JP); Hiroshi Kaneshige, Tokyo (JP); Masayuki Imamura, Tokyo (JP); Katsuya Iida, Yamanashi (JP); Takeomi Kawakami, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 802 days.

(21) Appl. No.: 10/516,082

(22) PCT Filed: May 30, 2003

(86) PCT No.: PCT/JP03/06852

§ 371 (c)(1),
(2), (4) Date: Nov. 29, 2004

(87) PCT Pub. No.: WO03/101805

PCT Pub. Date: Dec. 11, 2003

(65) Prior Publication Data

US 2005/0178232 A1 Aug. 18, 2005

(30) Foreign Application Priority Data

May 31, 2002 (JP) .............................. 2002-160469

(51) Int. Cl.
*F16H 55/00* (2006.01)

(52) U.S. Cl. ................ 74/388 PS; 74/89.23; 74/89.29; 74/89.45; 180/444

(58) Field of Classification Search ................ 74/89.23, 74/89.29, 89.45, 388 PS; 180/444
See application file for complete search history.

(56) References Cited

U.S. PATENT DOCUMENTS 2,926,541 A * 3/1960 Adams ...................... 74/388 R (Continued)

FOREIGN PATENT DOCUMENTS

DE 43 34 008 C1 5/1995

(Continued)

OTHER PUBLICATIONS

European Search Report dated Apr. 11, 2007, Application No. 03733194.9-1523.

*Primary Examiner*—David M Fenstermacher
(74) *Attorney, Agent, or Firm*—Westerman, Hattori, Daniels & Adrian, LLP.

(57) ABSTRACT

There is provided a steering control device for a vehicle of a new structure utilizing a ball screw mechanism for compacting the structure. The steering control device for a vehicle includes a first input shaft 1 connected to a handle, a second input shaft 2 connected to a motor 8, an output shaft 3 connected to a steering wheel, a first transmission 6 for rotating a nut 5 in accordance with the rotational motion of the first input shaft 1 so as to transmit the rotational motion of the first input shaft 1 to the rotational motion of the output shaft 3, and a second transmission 7 for moving the nut 5 linearly in the axial direction with respect to the output shaft 3 in accordance with the rotational motion of the second input shaft 2 so as to transmit the rotational motion of the second input shaft 2 to the rotational motion of the output shaft 3. The center line of the second input shaft and the center line of the output shaft are aligned on substantially the same straight line.

6 Claims, 5 Drawing Sheets

U.S. PATENT DOCUMENTS

| | | | |
|---|---|---|---|
| 6,186,268 B1 * | 2/2001 | Onodera et al. | 180/444 |
| 6,883,635 B2 * | 4/2005 | Lynn et al. | 180/444 |
| 6,973,990 B2 * | 12/2005 | Honaga et al. | 180/444 |

FOREIGN PATENT DOCUMENTS

| | | |
|---|---|---|
| DE | 101 59 700 A1 | 11/2002 |
| EP | 1 219 523 A1 | 7/2002 |
| JP | 4-118382 | 4/1992 |
| JP | 4-243667 | 8/1992 |
| JP | 2001-10508 | 1/2001 |
| JP | 2002-255046 | 9/2002 |

\* cited by examiner

STEERING CONTROLLER OF VEHICLE

FIELD OF THE INVENTION

The present invention relates to a steering control device for a vehicle capable of changing a rate of turning angle of a wheel with respect to a steering angle of a handle, for example, of the vehicle.

BACKGROUND ART

A steering control device mounted to a vehicle such as automobile serves to convert a rotation of a handle to a displacement in an axial direction of a tie rod and then to change direction of lateral wheels coupled with both end portions of the tie rod. The steering angle of the handle and the turning angle of the wheel in the steering control device generally have a constant relationship corresponding to each other. However, it is desirable to make large a rate of the turning angle with respect to the steering angle at a time of low speed driving of the automobile in a viewpoint of maneuverability of the vehicle such as easy garaging (back the car into garage).

As a steering control device for a vehicle having a conventional structure, FIG. 5 shows a steering control device utilizing a ball screw mechanism, which is disclosed in Japanese Patent Laid-open (KOKAI) Publication No. HEI 4-118382. This steering control device comprises a first ball screw mechanism 34 including a ball nut screwed to a screw shaft 32 connected to a handle 31, a second ball screw mechanism 37 including a ball nut 36 screwed to a screw shaft 35 connected to a driving wheel, and a transmission mechanism 39 coupling the ball nut 33 of the first ball screw mechanism 34 and the ball nut 36 of the second ball screw mechanism 37 together through a swingable lever member 42. The transmission mechanism 39 is provided with a connection rod 38 connecting the ball nut 33 of the first ball screw mechanism 34 to the lever member 42 in an axial direction thereof. Further, a distance between the center of swinging motion of the lever member 42 and a connecting portion of the ball nut 36 of the second ball screw mechanism 37 is adjustable.

When the handle 31 is operated, the screw shaft 32 of the first ball screw mechanism 34 is rotated and the ball nut 33 is displaced in the axial direction. According to such displacement of the ball nut 33 of the first ball screw mechanism 34, the second ball nut 36 connected to the lever member 42 of the transmission mechanism 39 is also displaced in the axial direction to thereby rotate the screw shaft 35 and transmit the steering power to the driving wheel. By adjusting, with respect to the center of the swinging motion of the lever member 42, the position of the connecting portion 41 at which the ball nut 36 of the second ball screw mechanism 37 is connected to the lever member 42, a ratio of the displacements of the respective ball nuts 33 and 36 can be changed. Accordingly, the rate of the handle steering angle with respect to the wheel turning angle can be changed.

DISCLOSURE OF THE INVENTION

However, in the steering control device utilizing the ball screw mechanism disclosed in Japanese Patent Laid-open (KOKAI) Publication No. HEI 4-118382, since a plurality of ball screw mechanisms are arranged in series or side by side, the entire structure including the steering control device expands in the axial direction or circumferential direction, and hence, it is difficult to make small or compact the entire structure.

An object of the present invention is therefore to provide a steering control device for a vehicle provided with an improved structure utilizing a ball screw mechanism to make compact the entire structure thereof.

Hereunder, the present invention is described. Further, it is to be noted that in the following, although reference numerals used in the drawings accompanied are added with parentheses ( ) to members or elements for the sake of easy understanding of the present invention, the present invention is not limited to the embodiment or like shown in the drawings.

To solve the above matters encountered in the prior art mentioned above, the inventor conceived an application of a thrust force to a nut screw engaged with an output shaft so as to rotate the output shaft in accordance with the conversion in motion from linear motion to rotational motion at a time of rotating a second input shaft by rotating the nut screw engaged with the output shaft so that the output shaft rotates following the rotation of the first input shaft.

More specifically, the invention of claim 1 achieves the above-mentioned object by providing a steering control device for a vehicle comprising: a housing (4); a first input shaft (1); a second input shaft (2); an output shaft (3) supported by the housing (4) in a state to allow the output shaft (3) to rotate around an axis thereof and limit a linear motion in the axial direction and having a center line aligned on substantially the same straight line on which a center line of the second input shaft (2) is aligned, the output shaft (3) being formed with a screw at an outer peripheral surface thereof; a nut (5) mounted to the output shaft (3); a first transmission (unit) (6) for rotating the nut in accordance with the rotational motion of the first input shaft (1) so as to transmit the rotational motion of the first input shaft (1) as the rotational motion of the output shaft (3); and a second transmission (unit) (7) for linearly moving the nut (5) in the axial direction of the output shaft (3) in accordance with the rotational motion of the second input shaft (2) so as to transmit the rotational motion of the second input shaft (2) as the rotational motion of the output shaft (3).

The first input shaft is, for example, connected to a handle, the second input shaft is connected to a motor, and the output shaft is connected to the driving (running) wheel.

When the first input shaft is rotated, the nut screw engaged with the output shaft is rotated by means of first transmission. When the nut is rotated, the output follows to rotate. Accordingly, when the first input shaft is rotated, the nut is also rotated. On the other hand, when the second input shaft is rotated, the nut is linearly moved by the second transmission in the axial direction with respect to the output shaft. When the nut is linearly moved in the axial direction with respect to the output shaft, the output shaft is rotated through the convention in motion of the screw mechanism from the linear motion to the rotational motion. Accordingly, by rotating the second input shaft, the output shaft is also rotated.

Furthermore, since the first and second input shafts are always coupled with the output shaft by way of the first and second transmissions, the torque can be always transmitted to the output shaft by rotating either one of the first input shaft or second input shaft. Therefore, when the first and second input shafts are simultaneously rotated, the rotational angle of the output shaft is the sum of the rotational angle ①of the output shaft due to the rotation of the first input shaft and the rotational angle ② of the output shaft due to the rotation of the second input shaft.

The present invention can realize the steering control device for a vehicle in combination of the screw mechanism and the first and second transmissions, and in addition, the center line of the second input shaft and the center line of the output shaft are aligned on substantially the same straight line. For this reason, the entire structure of the device can be made compact in size.

Moreover, the second transmission linearly moves the nut to thereby rotate the output shaft. In other wards, the second transmission applies the thrust force to the nut to thereby rotate the output shaft. In addition, by aligning the center lines of the second input shaft and output shaft substantially on the same line, the central point of the thrust force caused to the second input shaft and the central point of the force from the nut acting to the output shaft can be aligning on the same straight line. For this reason, the nut can be prevented from being applied with twisting force or like by the thrust force caused to the second input shaft, and hence, the force can be effectively transmitted.

The invention of claim 2 is characterized, in the steering control device for a vehicle of claim 1, in that the first transmission (6) permits the nut (5) to rotate in accordance with the rotational motion of the first input shaft (1) and to linearly move in the axial direction with respect to the first input shaft (1), and the second transmission (7) permits the nut to linearly move in the axial direction with respect to the output shaft (3) and to rotate.

According to this invention, the rotational motion of the first input shaft can be transmitted as the rotational motion of the output shaft, and in addition, the rotational motion of the second input shaft can be also transmitted as the rotational motion of the output shaft.

The invention of claim 3 is characterized, in the steering control device for a vehicle according to claim 1 or 2, in that the second input shaft (2) has a hollow structure, the second input shaft (2) has an inner peripheral surface to which a thread is formed, the second transmission (7) is provided with a hollow thrust transmission member (17) to be fitted to the second input shaft (3) and formed, at an outer peripheral portion thereof, with a thread and a spline mechanism (17a, 18) for the trust transmission member (17) secured to the housing (4) and adapted to guide the thrust transmission member (17) so as to linearly move in the axial direction thereof, and the nut (5) disposed inside the hollow thrust transmission member (17) is linearly movable in the axial direction thereof together with the thrust transmission member (17) and is rotatable around the axis with respect to the thrust transmission member (17).

According to this invention, the second transmission having the above-mentioned functions can be provided. Furthermore, since the screw mechanism including the output shaft and the nut is covered by the other screw mechanism including the second input shaft and the thrust transmission member, the entire structure of the device can be made further compact.

The invention of claim 4 is characterized, in the steering control device for a vehicle according to any one of claims 1 to 3, in that the first transmission (6) is provided with a spline shaft (11) for the first input shaft to be connected either one of the first input shaft (1) and the nut (5) and a spline outer cylinder (10) to be connected another one of the first input shaft (1) and the nut (5) so as to be fitted to the spline shaft (11) for the first input shaft.

According to this invention, the first transmission having the above-mentioned functions can be provided.

The invention of claim 5 is characterized, in the steering control device for a vehicle according to claim 3 or 4, in that a number of balls are interposed between the nut (5) and the output shaft (3), and the thrust transmission member (17) slides with respect to the second input shaft (2) without interposing a number of rolling balls between the thrust transmission member (17) and the second input shaft (2).

According to this invention, the thrust transmission member can slide with respect to the second input shaft without the balls being interposed between the second input shaft and the thrust transmission member, so that the driving torque of the second input shaft can be surely transmitted to the output shaft.

Furthermore, the invention of claim 6 is characterized by providing a steering control device for a vehicle comprising: a housing (4); a first input shaft (1); a hollow second input shaft (2) having an inner peripheral surface to which a thread is formed; an output shaft (3) supported by the housing (4) in a state to allow the output shaft (3) to rotate around an axis thereof and limit a linear motion in the axial direction and having a center line aligned on substantially the same straight line on which a center line of the second input shaft (2) is aligned, the output shaft (3) being formed with a screw at an outer peripheral surface thereof; a nut (5) mounted to the output shaft (3); a spline mechanism (10, 11) for the first input shaft for rotating the nut (5) in accordance with the rotational motion of the first input shaft (1) and linearly moving the nut (5) in the axial direction with respect to the first input shaft (1); a hollow thrust transmission member (17) fitted into the second input shaft (2) and formed, at an outer peripheral surface thereof, with a thread; and another spline mechanism (17a, 18) for the thrust transmission member fixed to the housing (4) and adapted to guide the linear motion of the thrust transmission member (17) in the axial direction thereof, wherein the nut (5) disposed inside the thrust transmission member (17) is moved linearly in the axial direction of the thrust transmission member together therewith and rotated around the axis of the thrust transmission member (17).

BEST MODE FOR EMBODYING THE INVENTION

Figure 1:
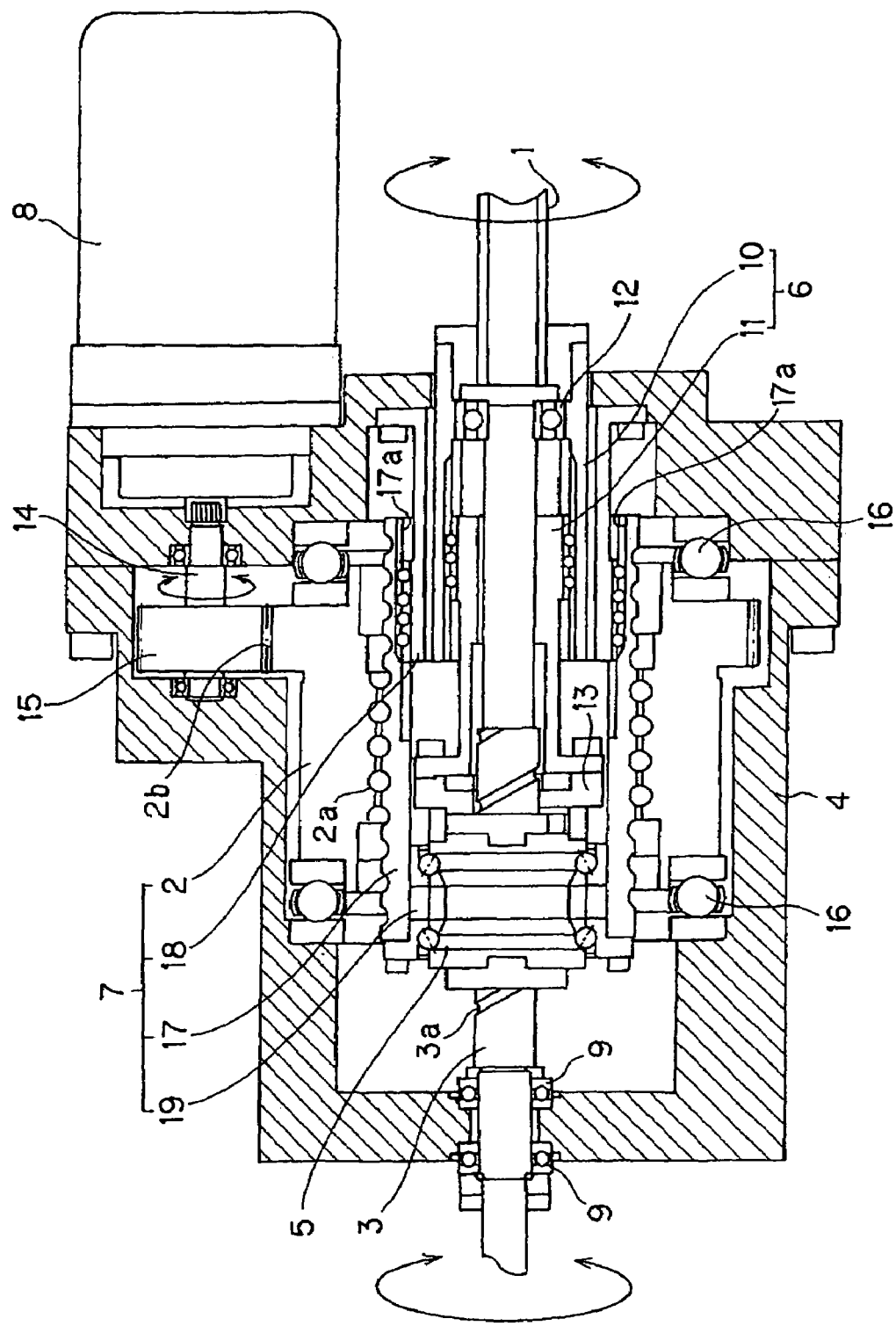
FIG. 1 is a sectional view showing a steering device according to one embodiment of the present invention.

FIG. 1 shows a steering device according to one embodiment of a steering control device for a vehicle of the present invention. This steering device is provided with two input shafts 1 and 2 and one output shaft 3. A first input shaft 1 is coupled with handle of a vehicle. A second input shaft 2 is connected to a motor 8. To the output shaft is connected a steering shaft for transmitting rotational motion (rotation) of the first and second input shafts 1 and 2 to a steering gear box and a steering wheel.

The motor 8 rotates in response to a control signal from a controller. Signals from a sensor detecting a vehicle speed, a steering angle sensor on the side of the first input shaft 1, and a turning angle sensor on the side of the output shaft 3 are inputted into the controller. The controller serves to properly change a ratio of the steering angle of the handle and to the turning angle of the wheel in response to the signals from these sensors. For example, the rate of the turning angle with respect to the steering angle is made small at a time of high speed running (driving) of the vehicle and is made large at a time of low speed running (driving) thereof, whereby the stable running performance can be ensured at the high speed running and maneuverability of the vehicle can be improved at the low speed running.

The steering device includes a housing 4, the first input shaft 1, the second input shaft 2, the output shaft 3, a nut 5 fitted to the output shaft 3, a first transmission (unit) 6 for rotating the nut 5 through the rotational motion of the first input shaft 1 so as to transmit the rotational motion of the first input shaft 1 as the rotational motion of the output shaft 3, and a second transmission (unit) 7 for linearly moving the nut 5 in the axial direction with respect to the output shaft through the rotational motion of the second input shaft 2 so as to transmit the rotational motion of the second input shaft 1 as the rotational motion of the output shaft 3.

The output shaft 3 is formed, at its outer peripheral surface, with a screw groove 3a, which has a semi-circular shape in section so as to permit balls to roll. The output shaft 3 is supported to the housing 4 by a pair of thrust bearings 9, 9 to be rotatable. Thus, the output shaft 3 is allowed to perform the rotational motion around the axis thereof and, on the other hand, limited in the linear motion.

The nut 5 having a cylindrical shape is fitted to the output shaft 3. The nut 5 has an inner peripheral surface on which a spiral screw groove is formed so as to correspond to the screw groove (thread) formed to the output shaft 3. This spiral screw groove of the nut 5 also has a semi-circular shape in section so as to permit the balls to roll. A number of balls are arranged between the screw groove of the output shaft 3 and the screw groove of the nut 5, and a return passage for circulating the balls is formed to the nut 5. The center line of the nut 5 and the center line of the output shaft are substantially coaxial with each other. Such output shaft 3 and nut 5 constitute a ball screw mechanism.

The first input shaft 1 is aligned on the same line as the output shaft 3 and arranged near the output shaft 3.

The first transmission 6 permits the nut 5 to rotate through the rotational motion of the first input shaft land to move linearly in the axial direction with respect to the first input shaft 1. More specifically, the first transmission 6 is connected to the nut 5 and a spline outer cylinder (sleeve) 10 connected to the first input shaft 1 and is provided with a spline shaft 11, for the first input shaft 1, which is fitted to the spline outer cylinder 10. This spline outer cylinder 10 and the spline shaft 11 for the first input shaft 1 constitute a first spline mechanism of the first input shaft 1.

The spline outer cylinder 10 connected to the first input shaft 1 is formed with a plurality of rows of ball rolling grooves which extend axially and along which the balls roll. A circulation passage for circulating the balls is formed to the spline outer cylinder 10. A radial bearing 12 is interposed between the spline outer cylinder 10 and the end of the output shaft 3.

The spline shaft 11 for the first input shaft 1 has an inner hollow structure in which the output shaft 3 extends so as to penetrate it. A plurality of rows of ball rolling grooves along which the balls roll are formed to the outer peripheral portion of the spline shaft 11 for the first input shaft 1 so as to extend In the axial direction thereof. A number of balls are interposed, closely to each other, between the spline outer cylinder 10 and the spline shaft 11 for the first input shaft 1. When the spline shaft 11 for the first input shaft moves linearly relative to the spline outer cylinder 10, the balls roll and move between the spline outer cylinder 10 and the spline shaft 11 for the first input shaft. The rolling balls circulate through the circulation passage (path) formed to the spline outer cylinder 10. The end portion of the spline shaft 11 for the first input shaft is connected to the nut 5 through a connection member 13.

In the described embodiment, although the spline outer cylinder (sleeve) 10 is connected to the first input shaft 1 and the spline shaft 11 for the first input shaft 1 is connected to the nut 5, in an alternation, the spline outer cylinder 10 may be connected to the nut 5 and the spline shaft 11 may be connected to the first input shaft 1. Furthermore, although a number of balls are interposed between the spline outer cylinder 10 and the spline shaft 11 for the first input shaft, in an alternation, the spline outer cylinder 10 may be constituted to be slidable with respect to the spline shaft 11 for the first input shaft 1 without interposing such balls.

The second input shaft 2 has an inner hollow structure, which has an inner peripheral surface to which a spiral screw groove (thread) 2a is formed and has an outer peripheral surface to which a gear (teeth) 2b engaging with a gear 15 fixed to an output shaft of the motor 14 or a timing belt or like is formed. The second input shaft 2 is arranged around the output shaft 3 so that the center line of the second input shaft 2 substantially accords with the center line of the output shaft 3. This second input shaft 2 is supported to the housing 4 to be rotatable by a pair of bearings 16, 16.

The second transmission 7 permits the nut 5 to rotate and move linearly in the axial direction with respect to the output shaft 3 through the rotational motion of the second input shaft 2. More specifically, the second transmission 7 is fitted to the second input shaft 2, fixed to the housing 4 and a hollow thrust transmission member 17 having an outer peripheral portion to which a screw groove (thread) is formed, and provided with a spline mechanism 17a, 18 for the thrust transmission member for guiding the linear motion of the thrust transmission member 17 in the axial direction. The nut 5 is disposed inside the hollow thrust transmission member 17 through a bearing 19 so as to be movable linearly in the axial direction together with the thrust transmission member 17 and to be rotatable around the axis thereof.

Figure 4:
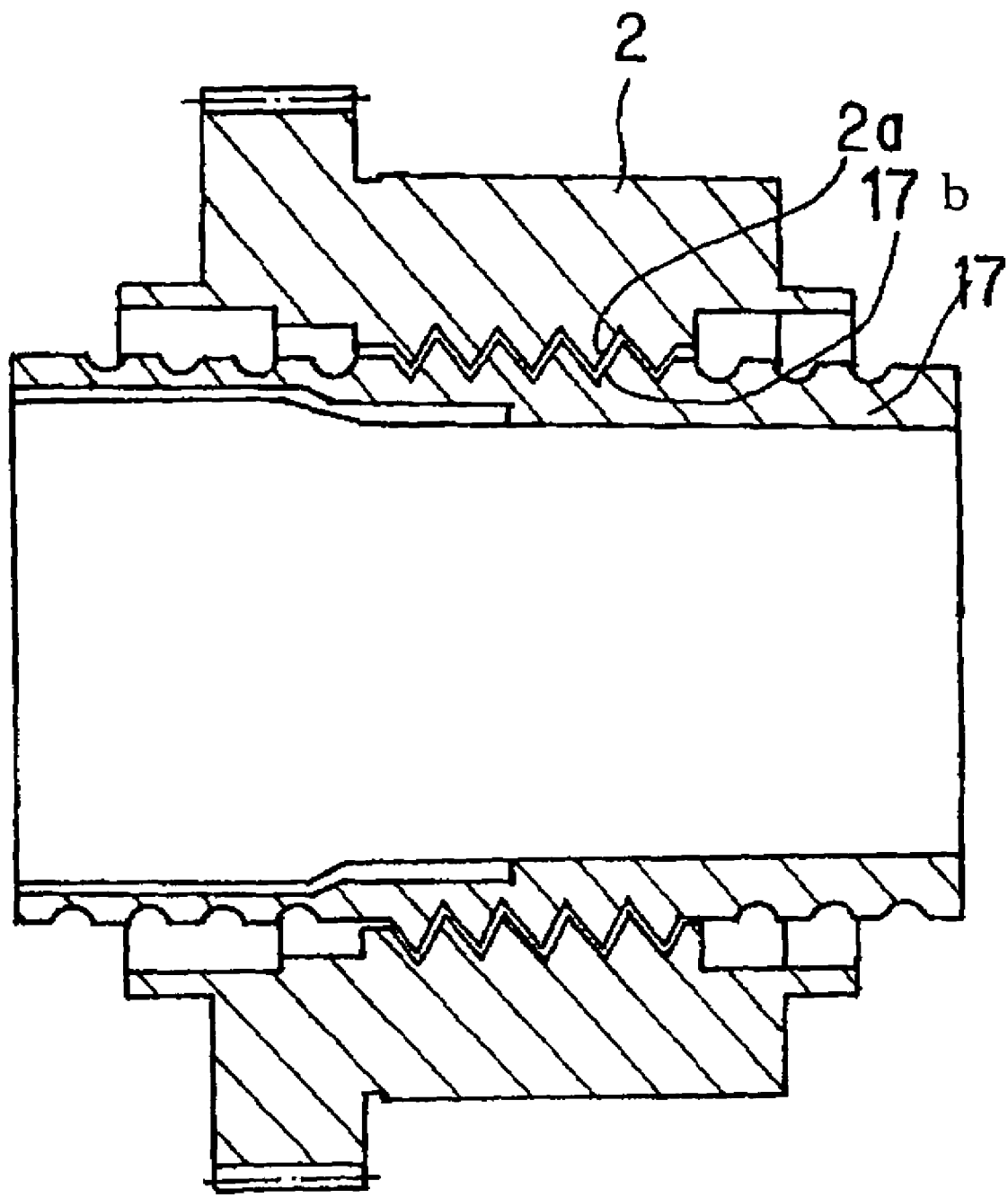
FIG. 4 is a sectional view showing another example of the second input shaft and a thrust transmission member.
Figure 5:
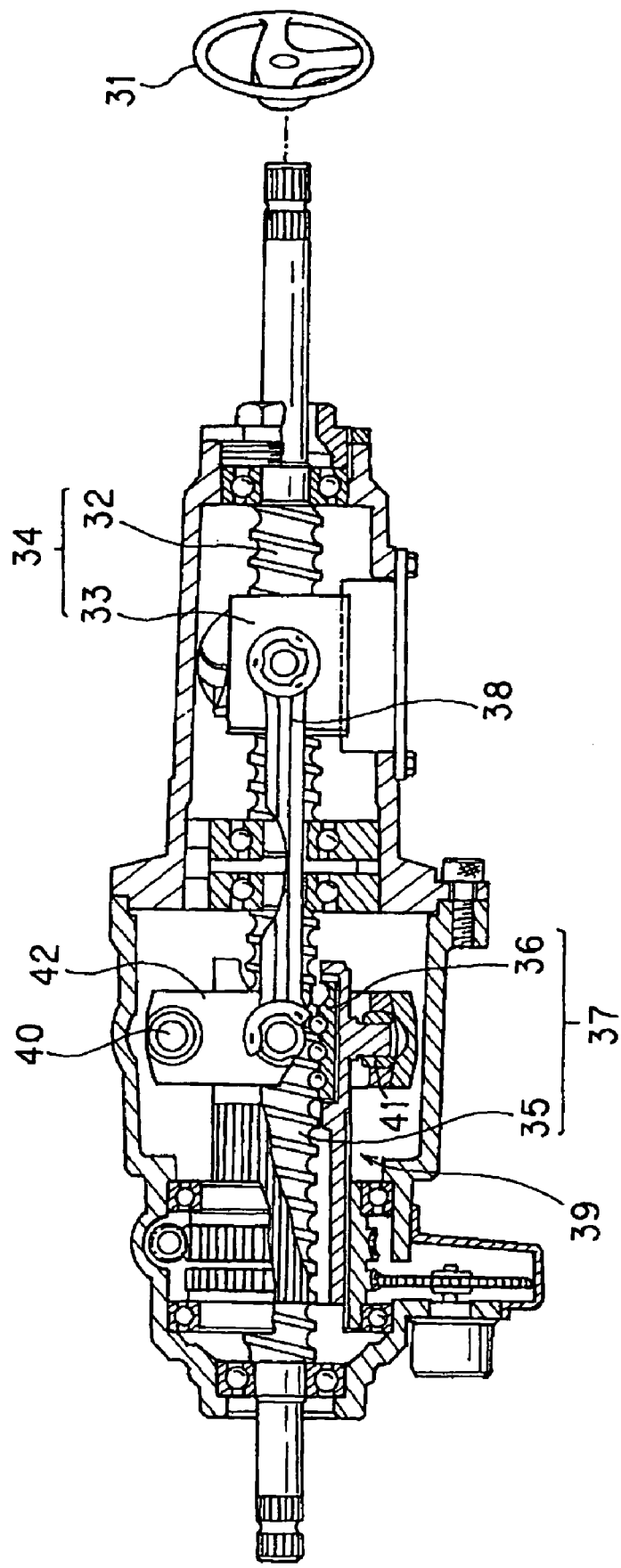
FIG. 5 is a sectional view showing a steering device utilizing a conventional ball screw mechanism.

The second input shaft 2 and the thrust transmission member 17 constitute a screw mechanism. The thrust transmission member 17 is engaged with the second input shaft 2 and a number of balls are interposed between the second input shaft 2 and the thrust transmission member 17 so as to permit the balls to roll therebetween. The output shaft 3 extends so as to penetrate inside the thrust transmission member 17 so that the center line of the thrust transmission member 17 substantially accords with that of the output shaft 3. Further, as shown in FIG. 4, the thrust transmission member 17 and the second input shaft 2 may be formed with screw grooves 2a and 17a, respectively, without interposing the balls therebetween. In such alternation, the thrust transmission member 17 slidably moves with respect to the second input shaft 2.

The inner peripheral surface of the thrust transmission member 17 is formed with a plurality of rows of ball rolling grooves 17a along which the balls roll. A number of balls are arranged between the thrust transmission member 17 and the spline shaft 18 for the thrust transmission member. When the thrust transmission member 17 moves linearly relative to the spline shaft 18 therefor, the balls interposed between the thrust transmission member 17 and the spline shaft 18 perform the rolling motion. The rolling balls circulate in the circulation passage formed to the thrust transmission member 17.

The spline shaft 18 for the thrust transmission member also has a hollow structure having one end fixed to the housing 4. A plurality of rows of ball rolling grooves along which the balls roll are formed to the outer peripheral surface of the spline shaft 18 for the thrust transmission member so as to extend axially.

The ball rolling grooves 17a and the spline shaft 18 for the thrust transmission member 17 constitute another spline mechanism for the thrust transmission member.

The nut 5 is connected to the inside portion of the thrust transmission member 17 to be rotatable through the bearing 19, which bears a force in radial and thrust directions.

Hereunder, the motion of the steering device of the present invention will be described.

Figure 2:
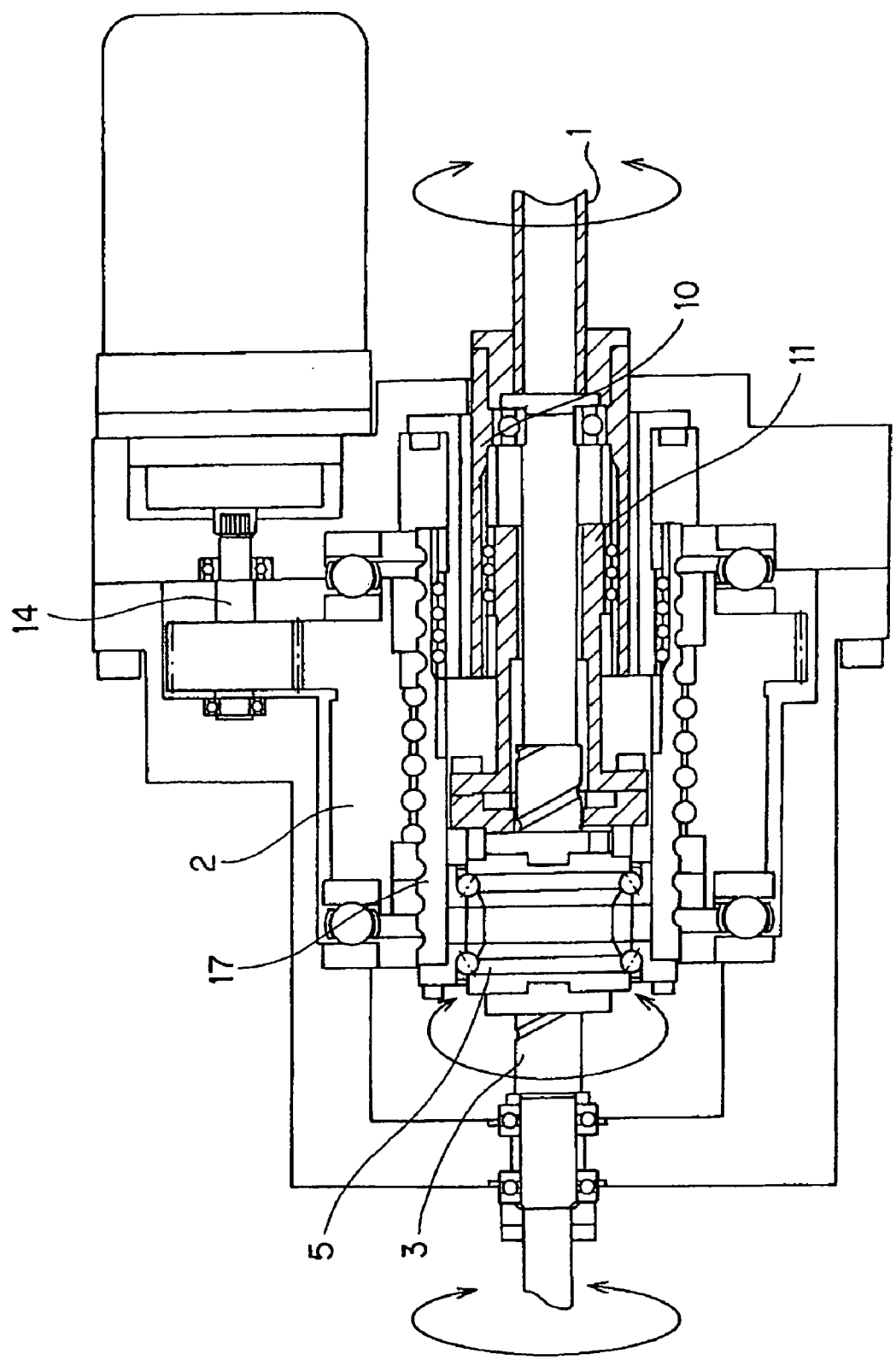
FIG. 2 is a sectional view showing a state in which a first input shaft of the steering device is rotated.

At first, the case, in which the output shaft 3 is rotated by the first input shaft 1, will be described. As shown in FIG. 2, when the first input shaft 1 is rotated, a torque of the first input shaft 1 is transmitted to the nut 5 through the first transmission 6 constituted by the spline outer cylinder (sleeve) 10 and the spline shaft 11. In this state, the linear motion of the nut 5 with respect to the output shaft 3 is limited by the second transmission 7 constituted by the thrust transmission member 17, the spline shaft 18 for the thrust transmission member and the bearing 19. According to this reason, when the nut 5 is rotated by the rotation of the first input shaft 1, the output shaft 3 follows to be rotated.

Figure 3:
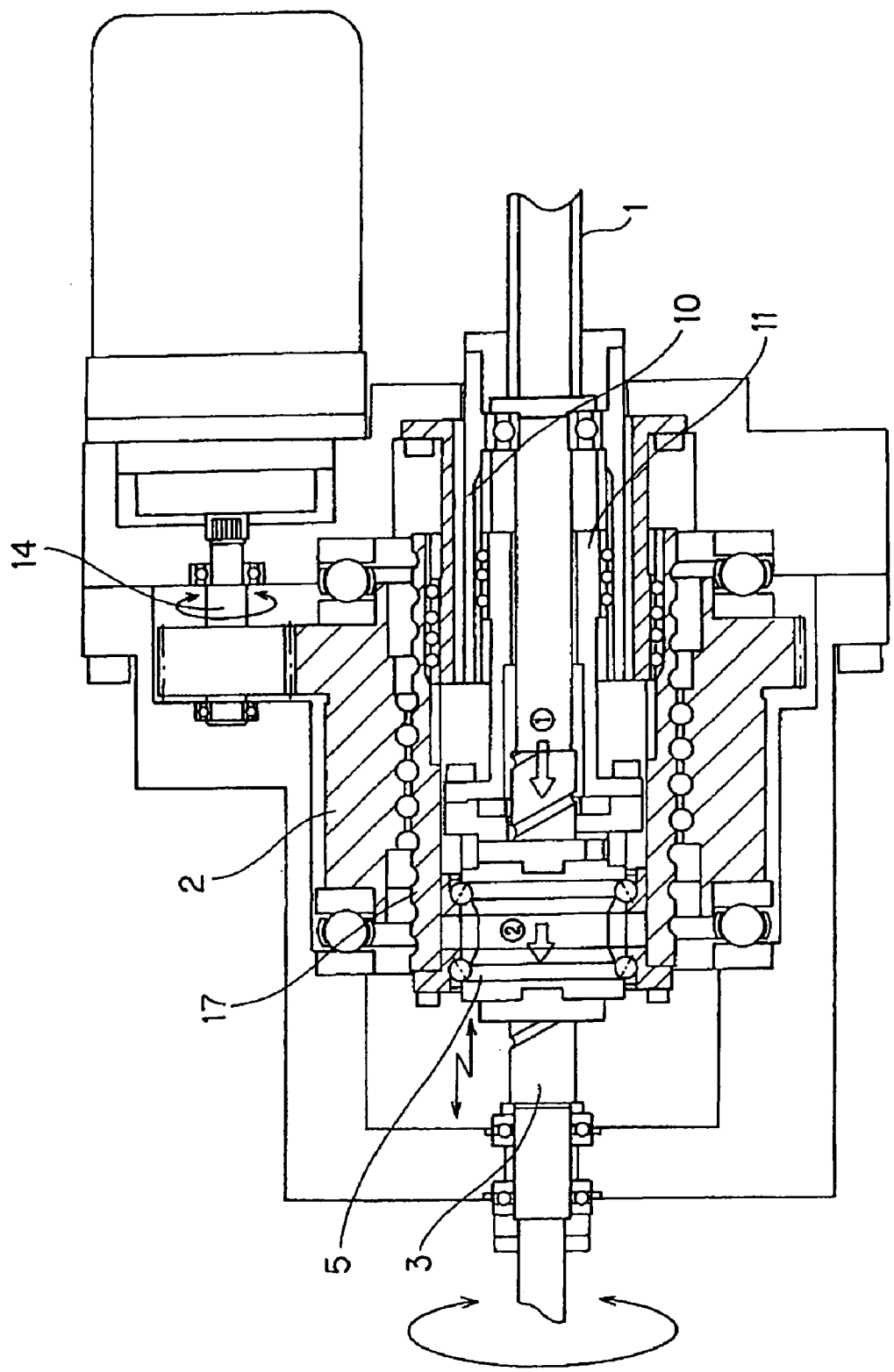
FIG. 3 is a sectional view showing a state in which a second input shaft of the steering device is rotated.

Next, the case, in which the output shaft 3 is rotated by the second input shaft 2, will be described. As shown in FIG. 3, when the second input shaft 2 is rotated, the nut 5 is linearly moved in the axial direction with respect to the output shaft 3 by the second transmission 7 constituted by the thrust transmission member 17 and the spline shaft 18 for the thrust transmission member. In this state, the rotational motion of the nut 5 around the output shaft 3 is limited by the first transmission 6 constituted by the spline outer cylinder (sleeve) 10 and the spline shaft 11. According to this reason, when the nut 5 is moved linearly with respect to the output shaft 3, the output shaft 3 is rotated by the screw mechanism.

As shown in the following Table 1, by simultaneously rotating the first input shaft and second input shaft, it becomes possible to increase the speed or decrease the speed. In this Table 1, the letter A represents a rotational angle of the output shaft by the rotation of the first input shaft, the letter B represents a rotational angle of the output shaft by the rotation of the second input shaft, the character "+" represents the clockwise direction and the character "−" represents the counterclockwise direction.

TABLE 1

| Angle (I) | 0 (First input shaft is fixed) | +A | +A | −A | +A | −A |
|---|---|---|---|---|---|---|
| Angle(II) | +B | 0 (Second input shaft is fixed) | +B | +B | −B | −B |
| Angle (I + II) | +B | +A | +A+B | +A+B | +A−B | −A−B |

Angle (I): rotational angle of output shaft due to rotation of first input shaft
Angle (II): rotational angle of output shaft due to rotation of second input shaft
Angle (I + II): sum of rotational angles of output shaft Furthermore, as shown in FIG. 4, in the case where no ball exists between the second input shaft 2 and the thrust transmission member 17, the thrust transmission member 17 performs the sliding motion with respect to the second input shaft 2, so that the driving torque of the second input shaft 2 can be surely transmitted to the output shaft 3. Moreover, as shown in FIG. 3, since the center line of the second input shaft and the center line of the output shaft 3 are substantially aligned on the same line, the center point ① of the thrust force caused to the second input shaft 2 and the center point ② of a force acting on the output shaft 3 from the nut 5 can be aligned on the same straight line. Therefore, the torque of the second input shaft 2 can be effectively transmitted to the output shaft 3.

It is further to be noted that the present invention is not limited to the described embodiment and many other changes or modifications may be made without departing from the scopes of the present invention. For example, the second input shaft may not be rotated by the gearing mechanism and may be directly rotated by a stator by constituting the second input shaft as a rotor of a hollow motor.

The present invention is applicable to various uses, without limiting to a steering device capable of changing a rate of a turning angle with respect to a steering angle, such as, for example, an automatic steering device, an active steering device or like, as far as it is provided with two input shafts and one output shaft and the torques or rotational angles of these input shafts can be added.

As mentioned hereinbefore, according to the present invention, a steering control device for a vehicle can be realized in combination of the screw mechanism and the first and second transmissions, and moreover, the center line of the second input shaft and the center line of the output shaft are aligned on substantially the same straight line, so that the entire structure of the device can be made compact.

The invention claimed is:

1. A steering control device for a vehicle comprising:
   a housing;
   a first input shaft;
   a second input shaft;
   an output shaft supported by the housing in a state to allow the output shaft to rotate around an axis thereof and limit a linear motion in the axial direction and having a center line aligned on substantially the same straight line on which a center line of second input shaft is aligned, said output shaft being formed with a screw at an outer peripheral surface thereof;
   a nut mounted to the output shaft;
   a first transmission unit for rotating the nut in accordance with the rotational motion of the first input shalt so as to transmit the rotational motion of the first input shaft to the rotational motion of the output shaft; and
   a second transmission unit for linearly moving the nut in the axial direction of the output shaft in accordance with the rotational motion of the second input shaft so as to transmit the rotational motion of the second input shaft to the rotational motion of the output shaft.

2. A steering control device for a vehicle according to claim 1, wherein said first transmission unit permits the nut to rotate in accordance with the rotational motion of the first input shaft and to linearly move in the axial direction with respect to the first input shaft, and said second transmission unit permits the nut to linearly move in the axial direction with respect to the output shaft and to rotate.

3. A steering control device for a vehicle according to claim 1 or 2, wherein said second input shaft has a hollow structure, said second input shaft has an inner peripheral surface to which a thread is formed, said second transmission unit is provided with a hollow thrust transmission member to be fitted to the second input shaft and formed, at an outer peripheral portion thereof, with a thread and a spline mechanism for the trust transmission member secured to the housing and adapted to guide the thrust transmission member so as to linearly move in the axial direction thereof, and said nut disposed inside the hollow thrust transmission member is linearly movable in the axial direction thereof together with the thrust transmission member and is rotatable around the axis with respect to the thrust transmission member.

4. A steering control device for a vehicle according to claim 1 or 2, wherein said first transmission unit is provided with a spine shaft for the first input shaft to be connected either one of the first input shaft and the nut and a spine outer cylinder to be connected another one of the first input shaft and the nut so as to be fitted to the spine shaft for the first input shaft.

5. A steering control device for a vehicle according to claim 3, wherein a number of balls are interposed between the nut and the output shaft, and the thrust transmission member slides with respect to the second input shaft without interposing a number of rolling balls between the thrust transmission member and the second input shaft.

6. A steering control device for a vehicle comprising:
a housing;
a first input shaft;
a hollow second input shaft;
an output shaft supported by the housing in a state to allow the output shaft to rotate around an axis thereof and limit a linear motion in the axial direction and having a center line aligned on substantially the same straight line on which a center line of the second input shaft is aligned, said output shaft being formed with a screw at an outer peripheral surface thereof;
a nut mounted to the output shaft;
a spline mechanism for the first input shaft for rotating the nut in accordance with the rotational motion of the first input shaft and linearly moving the nut in the axial direction with respect to the first input shaft;
a hollow thrust transmission member fitted into the second input shaft and formed, at an outer peripheral surface thereof, with a thread; and
another spine mechanism for the thrust transmission member fixed to the housing and adapted to guide the linear motion of the thrust transmission member in the axial direction thereof,
wherein the nut disposed inside the thrust transmission member is moved linearly in the axial direction of the thrust transmission member together therewith and rotated around the axis of the thrust transmission member.

* * * * *